(12) United States Patent
Hickey

(10) Patent No.: US 11,254,224 B2
(45) Date of Patent: Feb. 22, 2022

(54) BATTERY LOAD MECHANISM FOR ELECTRIC LHD MINING MACHINE

(71) Applicant: Artisan Vehicle Systems, Inc., Camarillo, CA (US)

(72) Inventor: Kyle Hickey, Moorpark, CA (US)

(73) Assignee: ARTISAN VEHICLE SYSTEMS, INC., Camarillo, CA (US)

(*) Notice: Subject to any disclaimer, the term of this patent is extended or adjusted under 35 U.S.C. 154(b) by 32 days.

(21) Appl. No.: 16/434,396

(22) Filed: Jun. 7, 2019

(65) Prior Publication Data
US 2020/0384869 A1 Dec. 10, 2020

(51) Int. Cl.
*B60L 50/60* (2019.01)

(52) U.S. Cl.
CPC .................................... *B60L 50/66* (2019.02)

(58) Field of Classification Search
CPC .. B60S 5/06; B60L 53/80; B60L 50/66; B25J 5/007; B25J 11/00; B25J 11/008; B25J 15/00
See application file for complete search history.

(56) References Cited

U.S. PATENT DOCUMENTS

| | | | |
|---|---|---|---|
| 3,799,063 A | 3/1974 | Reed | |
| 3,834,563 A | 9/1974 | Teti | |
| 4,397,365 A * | 8/1983 | Harbe | B60L 50/66 180/68.5 |
| 4,636,133 A | 1/1987 | Hess | |
| 5,163,537 A * | 11/1992 | Radev | B60L 50/60 180/65.1 |
| 5,598,083 A * | 1/1997 | Gaskins | B60K 1/04 414/458 |
| 5,612,606 A | 3/1997 | Guimarin | |
| 5,664,932 A * | 9/1997 | Clonch | B60L 50/64 414/680 |
| 5,820,331 A * | 10/1998 | Odell | B60K 1/04 414/685 |
| 5,879,125 A * | 3/1999 | Odell | B60K 1/04 414/685 |
| 7,770,673 B2 | 8/2010 | Allen et al. | |
| 7,993,155 B2 | 8/2011 | Heichal et al. | |
| 8,146,694 B2 * | 4/2012 | Hamidi | B60L 50/64 180/68.5 |
| 9,358,895 B2 * | 6/2016 | Avganim | B60L 50/66 |
| 9,960,396 B2 | 5/2018 | Huff et al. | |
| 9,969,283 B2 * | 5/2018 | Deahl | B60L 11/1822 |

(Continued)

FOREIGN PATENT DOCUMENTS

JP 2001088563 A 4/2001

*Primary Examiner* — Bryan A Evans
(74) *Attorney, Agent, or Firm* — Plumsea Law Group, LLC

(57) ABSTRACT

A mounting and dismounting system for replaceable power sources is disclosed. The mounting and dismounting system is integrated into a vehicle. The vehicle may be an electric vehicle and the replaceable power source may include at least one battery. The mounting and dismounting system includes a lift rack assembly that engages shafts on the replaceable power source to raise and lower the replaceable power source. The mounting and dismounting system also includes a set of retaining members to help keep the shafts in place. The lift rack assembly includes rack members that move in a substantially vertical direction to limit swinging and tilting.

17 Claims, 12 Drawing Sheets

(56) References Cited

U.S. PATENT DOCUMENTS

| | | |
|---|---|---|
| 9,994,117 B2 | 6/2018 | Huff et al. |
| 10,063,069 B1 | 8/2018 | Huff et al. |
| 2007/0113921 A1 | 5/2007 | Capizzo |
| 2007/0248445 A1 | 10/2007 | Honeyman et al. |
| 2010/0071979 A1 | 3/2010 | Heichal et al. |
| 2012/0018235 A1 | 1/2012 | O'Quinn et al. |
| 2012/0251281 A1 | 10/2012 | Mulato |
| 2014/0250653 A1 | 9/2014 | Droste |
| 2015/0033537 A1 | 2/2015 | Poillot et al. |
| 2015/0071747 A1 | 3/2015 | Deahl et al. |
| 2018/0154789 A1 | 6/2018 | Janku |
| 2018/0334782 A1 | 11/2018 | Huff et al. |
| 2019/0263241 A1 | 8/2019 | Huff et al. |
| 2019/0263242 A1 | 8/2019 | Huff et al. |
| 2019/0263269 A1 | 8/2019 | Huff et al. |
| 2019/0263270 A1 | 8/2019 | Huff et al. |
| 2020/0156500 A1 | 5/2020 | Huff et al. |
| 2020/0157769 A1 | 5/2020 | Huff et al. |

\* cited by examiner

BATTERY LOAD MECHANISM FOR ELECTRIC LHD MINING MACHINE

CROSS-REFERENCE TO RELATED APPLICATION(S)

This application is related to commonly owned U.S. patent application Ser. No. 16/434,390, entitled "Electric Load-Haul-Dump Mining Machine"; U.S. patent application Ser. No. 16/434,400, entitled "Electric Power Distribution System and Method for Electric Mining Machine"; and U.S. patent application Ser. No. 16/434,405, entitled "Separable Tow Hook Brake Release System", all filed concurrently herewith on Jun. 7, 2019, and each of which is incorporated herein by reference in its entirety.

BACKGROUND OF THE INVENTION

1. Field of the Invention

The present disclosure relates broadly to electric machines and vehicles, and more specifically to electric machines and vehicles used in subsurface mines.

2. Description of Related Art

An overview of a sub-surface mine environment and general description of electric vehicles for mining is described in U.S. Pat. No. 9,994,117, issued on Jun. 12, 2018, titled "System And Method For Providing Power To A Mining Operation," the entire contents of which are hereby incorporated by reference. The present disclosure relates to heavy duty electric powered machines or vehicles that may operate in a continuous work environment such as a sub-surface mine. The battery packs employed in electric mining machines are heavy-duty, high powered battery packs which are comprised of multiple battery modules contained in a pack housing. Each module is comprised of multiple cells. The modules are equipped with an array of operational sensors and are provided with electronic components to provide data from the sensors to a separate maintenance network. Sensors can include temperature sensors, timing devices, charge level detection devices, and other monitoring devices which can be employed to provide an operations center with accurate, real-time data regarding the performance of the module and its performance history. Details of exemplary battery packs and battery management systems and the associated data generation and monitoring can be found in commonly owned U.S. Pat. No. 9,960,396 issued on May 1, 2018, titled "Module Backbone System;" and U.S. Pat. No. 10,063,069 issued on Aug. 28, 2018, titled "Module Maintenance System;" the entire contents of which are hereby incorporated by reference.

Co-pending and commonly owned U.S. application Ser. No. 15/980,314 filed May 15, 2018, titled "Electrically Powered Mining Vehicle;" U.S. application Ser. No. 15/908,794 filed Feb. 28, 2018, titled "Electric Haul Truck;" U.S. application Ser. No. 15/908,799 filed Feb. 28, 2018, titled "Mounting and Dismounting System for a Replaceable power source;" U.S. application Ser. No. 15/908,802 filed Feb. 28, 2018, titled "Method and System for Mounting and Dismounting Batteries in a Vehicle;" and U.S. application Ser. No. 15/908,804 filed Feb. 28, 2018, titled "Alignment and Locking Mechanism for Removable Replaceable power source" contain descriptions of electric mining machines, the batteries, and the sub-surface mining environment, the entire contents of which are hereby incorporated by reference.

SUMMARY OF THE INVENTION

In one aspect, a mounting and dismounting system for a replaceable power source is attached to a chassis of a vehicle and includes a rack member. The rack member includes a lifting portion configured to engage the replaceable power source. The system also includes an actuator for lifting the rack member. The rack member has a lowest position and a highest position. The rack member moves along a linear direction between the lowest position and the highest position.

In another aspect, a system for swapping replaceable power sources includes a mounting and dismounting system. The mounting and dismounting system includes a rack member with a lifting portion and an actuator for lifting the rack member. The system for swapping replaceable power sources also includes a replaceable power source further comprising an outer casing with a shaft. The lifting portion is configured to engage the shaft and the actuator moves the rack member in a linear direction between a lowest position and a highest position.

In another aspect, a vehicle includes a replaceable power source for powering the vehicle, the replaceable power source including an outer casing with a shaft, an onboard mounting and dismounting system for raising and lowering the replaceable power source and a mounting and dismounting system. The mounting and dismounting system further includes a rack member with a lifting portion and an actuator for lifting the rack member along a linear direction between a lowest position and a highest position. The lifting portion engages the shaft to raise and lower the replaceable power source.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Electric mining machines are generally powered by onboard battery packs. The machines can be load-haul-dump (LHD) machines, scalers, graders, scoops, rock breakers, cutters, haulers or a combination. In general, electric mining machines are heavy duty vehicles engineered for the challenging subsurface environments and limited spaces powered by an onboard battery or other power source. The machines generally include a tool end, heavy-duty wheels and tires, an operator area, controls, and may include a removable power source mounted onboard the machine.

This disclosure is directed to a mounting and dismounting system for a replaceable power source, such as a replaceable battery assembly. Using a replaceable power source allows a vehicle to swap energy sources quickly, rather than waiting for the power source to recharge. This saves time and improves operating efficiency, especially in underground mining operations. Power sources for electric vehicles, such as batteries, may be very heavy and cannot be mounted or dismounted by a human operator. The exemplary system includes features that allow a replaceable power source to be automatically mounted and dismounted from a vehicle, without the need for a separate off-board lifting and lowering system. The system uses a lift rack assembly to raise and lower a replaceable power source (such as a battery assembly) in the vertical direction. By moving the replaceable power source only along the vertical direction, the system may help reduce the tendency of the replaceable power source to swing or tilt during mounting or dismounting. Lifting and lowering in only the vertical direction may also eliminate collisions between the replaceable power source and the vehicle in the horizontal direction that could occur in some battery lift systems that swing a battery up and towards the vehicle simultaneously. The system also includes hook shaped lifting portions and hook shaped retaining members that are oriented in opposite directions. The lifting portions receive graspable elements (e.g., bars) on the replaceable power source and lift the replaceable power source until the graspable elements are engaged by the retaining members from above. Because the exemplary system described below and shown in the figures does not require manually aligning a replaceable power source with a vehicle prior to mounting, this system facilitates the transition to fully autonomous mining vehicles.

Figure 1:
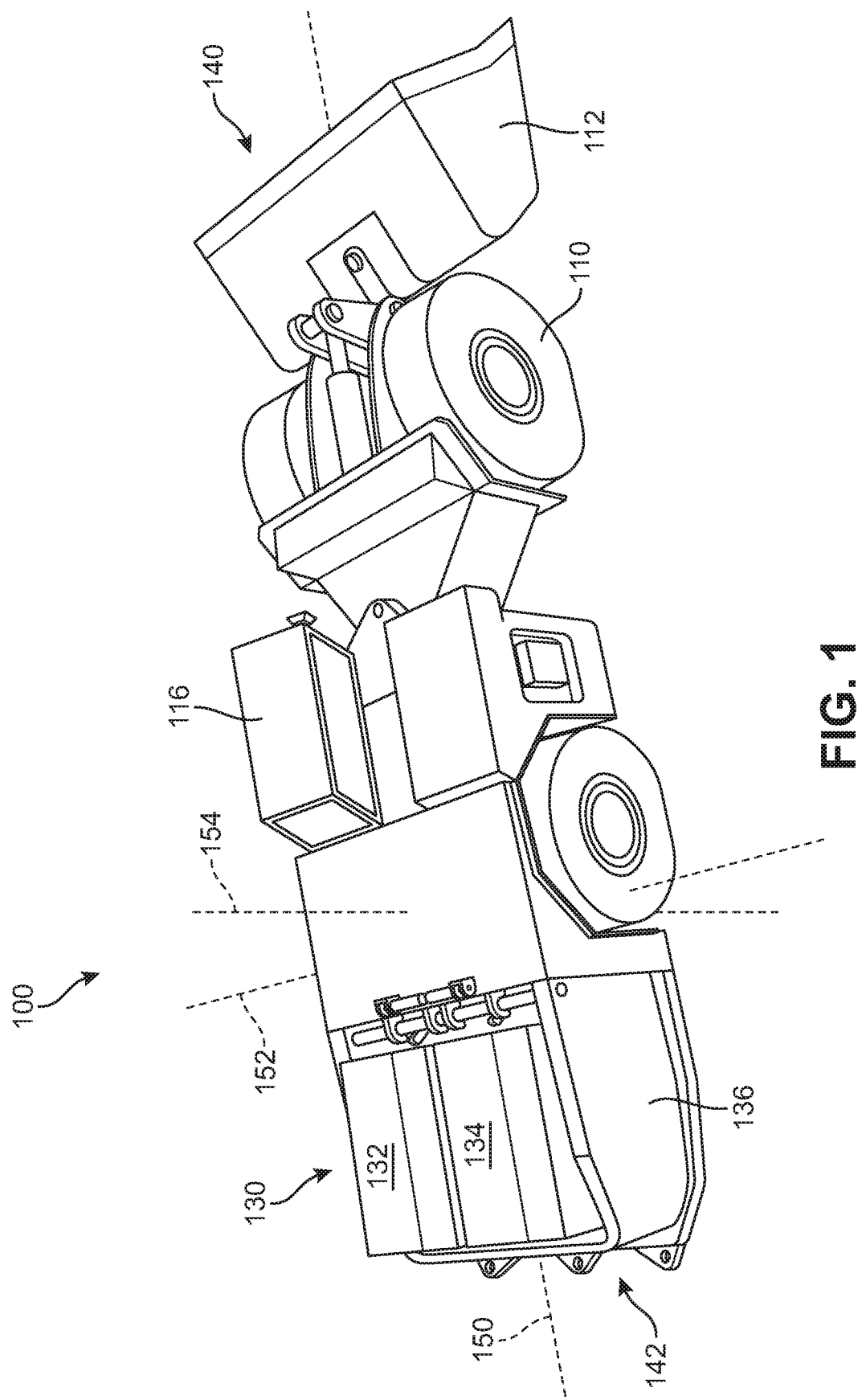
FIG. 1 is a schematic view of an electric load haul dump vehicle, according to an embodiment.

FIG. 1 is a schematic view of an electrically powered mining vehicle 100. In this exemplary embodiment, vehicle 100 may be a load haul dump (LHD) mining vehicle. However, in other embodiments, the provisions described below could be incorporated into various other kind of electric vehicles.

Vehicle 100 may include standard provisions for a mining vehicle, such as wheels 110 and scoop 112. Vehicle 100 may also include provisions for powering wheels 110 and scoop 112. Vehicle 100 is also provided with various standard vehicular mechanisms and capacities, such as passenger cab 116 for receiving one or more operators.

For purposes of reference, vehicle 100 may be identified with three different axes. These include a lengthwise axis 150 extending through a lengthwise dimension of vehicle 100, a widthwise axis 152 extending through a widthwise dimension of vehicle 100, and a vertical axis 154 extending through a dimension associated with the height of vehicle 100. The widthwise axis 152 may extend between opposing side surfaces of vehicle 100, while vertical axis 154 extends between an opposing bottom surface and top surface of vehicle 100.

Embodiments can incorporate a replaceable power source that powers one or more electric motors of vehicle 100. As used herein, the term "replaceable power source" refers to any kind of power source that can be interchanged. In one embodiment, a replaceable power source comprises a battery pack assembly. A battery pack assembly comprises two or more battery packs. As used herein, the term "battery pack" generally refers to multiple battery modules in a heavy-duty pack housing. Each module is comprised of multiple battery cells. In this way, a battery pack also refers to a collection of individual battery cells. The battery cells, and therefore modules, are functionally interconnected together as described in the previously incorporated pending applications. In some embodiments, a battery pack assembly may also include a casing or housing (such as a cage) or similar container for holding the separate battery packs together. More broadly, a replaceable power source may comprise a casing or housing for retaining and supporting a powering system, such as a battery, engine or other power source.

In different embodiments, a battery pack could incorporate any suitable kind of battery cell. Examples of battery cells include capacitors, ultra-capacitors, and electrochemical cells. Examples of electrochemical cells include primary (e.g., single use) and secondary (e.g., rechargeable). Examples of secondary electrochemical cells include lead-acid, valve regulated lead-acid (VRLA), gel, absorbed glass mat (AGM), nickel-cadmium (NiCd), nickel-zinc (NiZn), nickel metal hydride (NiMH), lithium-ion (Li-ion), and the like. A battery cell may have various voltage levels. In particular, in some cases two different battery cells in a battery pack could have different voltage levels. Similarly, the battery cell may have various energy capacity levels. In particular, in some cases, two different battery cells in a battery pack could have different capacity levels.

As seen in FIG. 1, vehicle 100 is configured with a replaceable power source 130. Scoop 112 may be disposed at a first end 140 of vehicle 100 while replaceable power source 130 may be disposed at a second end 142. In other embodiments, replaceable power source 130 could be attached to a different portion of vehicle 100.

In the embodiment shown in FIG. 1, replaceable power source 130 includes two battery packs. These include a first battery pack 132 and a second battery pack 134. First battery pack 132 and second battery pack 134 may be disposed in a side-by-side arrangement. Moreover, first battery pack 132 and second battery pack 134 are retained within a battery cage 136.

Replaceable power source 130 may be removably attached to vehicle 100. As used herein, the term "removably attached" refers to two components that are joined together but that can be separated without destroying one or the other component. That is, the components can be non-destructively detached from one another. Exemplary modalities of "removable attachment" include connections made using removable fasteners, latches, locks, hooks, magnetic connections as well as other kinds of connections.

Figure 2:
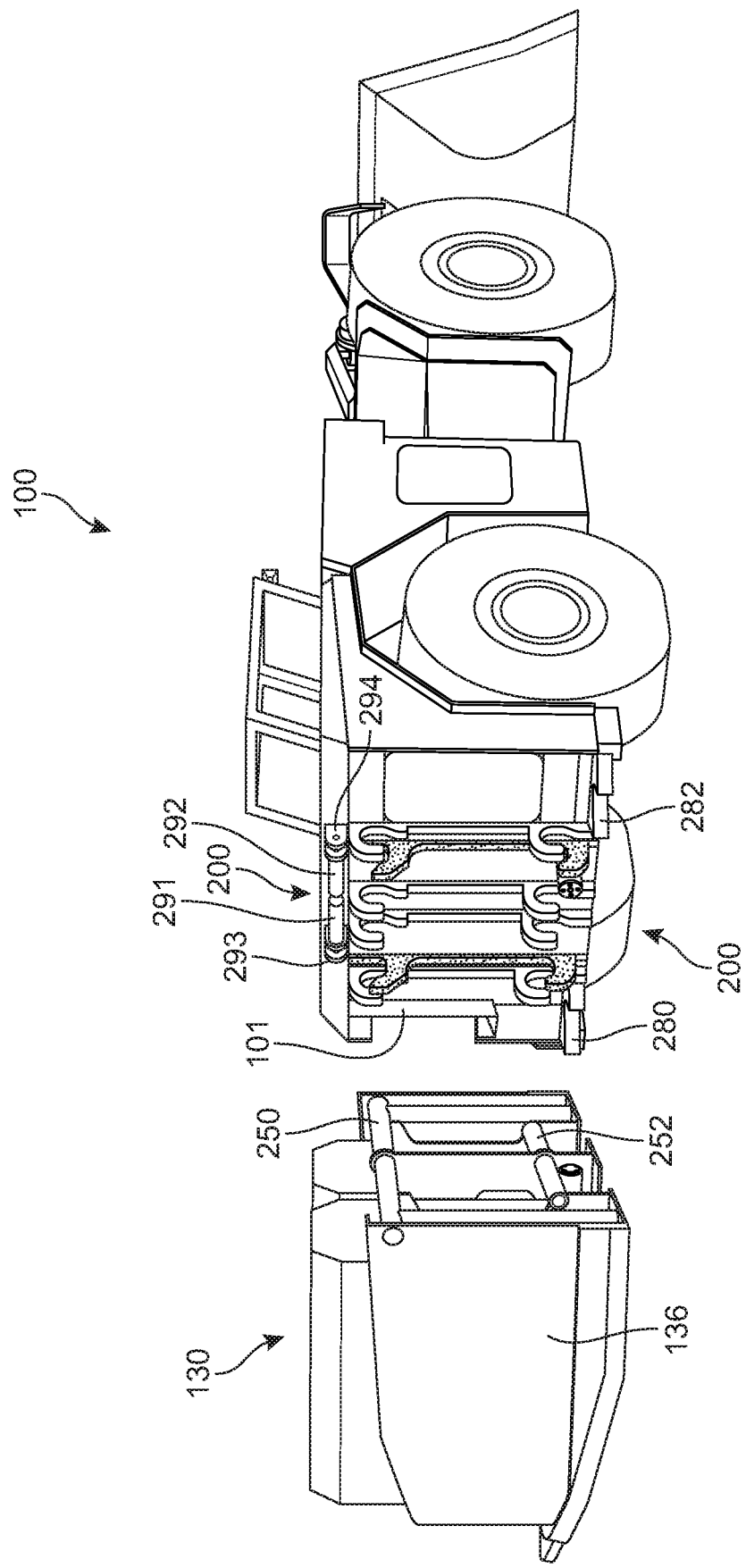
FIG. 2 is a schematic view of the vehicle of FIG. 1, with a replaceable power source removed.

FIG. 2 is a schematic view of vehicle 100 with replaceable power source 130 removed. In order to facilitate interchanging replaceable power sources, vehicle 100 includes a mounting and dismounting system 200, also referred to simply as system 200. Mounting and dismounting system 200 is attached to vehicle chassis 101 (or frame) of vehicle 100. In other words, system 200 is integrated into vehicle 100.

Figure 3:
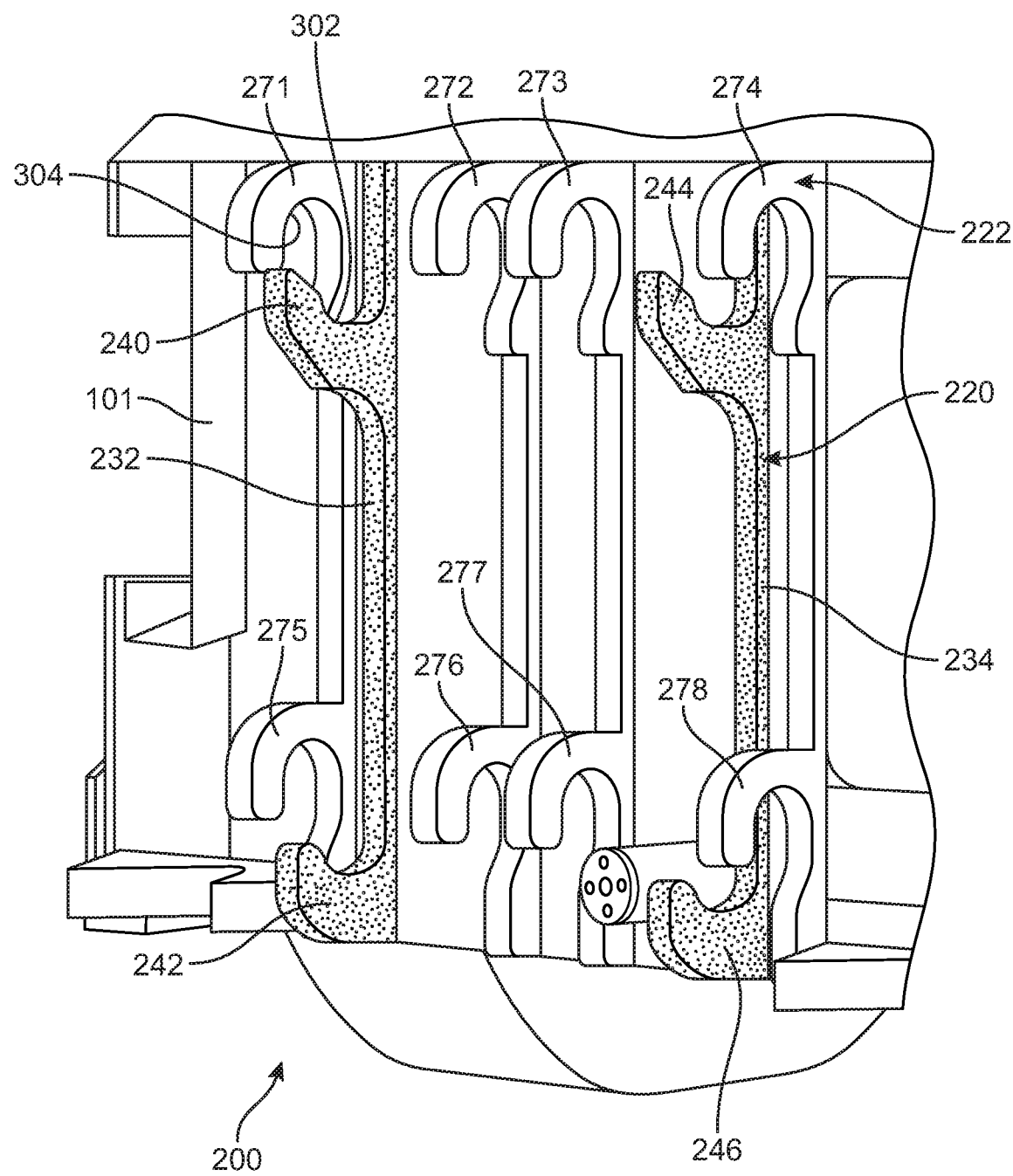
FIG. 3 is a close-up view of a mounting and dismounting system of the vehicle in FIG. 1.

As seen in FIG. 2, replaceable power source 130 includes an upper shaft 250 and a lower shaft 252. As shown in FIGS. 2-3, each of these shafts may comprise a bar or tube that extends horizontally across one side of battery cage 136. System 200 may include features to engage these shafts and use them to lift and retain replaceable power source 130 in place against vehicle 100.

FIG. 3 depicts an enlarged view of mounting and dismounting system 200. Referring to FIG. 3, system 200 comprises a lift rack assembly 220 and a plurality of retaining members 222. For purposes of illustration, the pieces of lift rack assembly 220 are depicted with shading in FIGS. 2-3, to distinguish the lift rack assembly from the plurality of retaining members. Lift rack assembly 220 includes a pair of rack members. Specifically, a first rack member 232 and a second rack member 234. Each rack member is further comprised of two lifting portions. First rack member 232 includes a first upper lifting portion 240 and a first lower lifting portion 242. Second rack member also includes a second upper lifting portion 244 and a second lower lifting portion 246.

The rack members are arranged to provide four points of contact with the replaceable power source. The rack members may be spaced in a horizontal direction (for example, along the widthwise axis 152 of vehicle 100 shown in FIG. 1). Also, the lifting portions on each rack member may be set at different vertical heights (for example, with respect to the vertical axis 154 of vehicle 100 shown in FIG. 1). With this arrangement, first upper lifting portion 240 and second upper lifting portion 244 are configured to engage and lift upper shaft 250 of replaceable power source 130. Likewise, first lower lifting portion 242 and second lower lifting portion 246 are configured to engage and lift lower shaft 252 of replaceable power source 130.

Each lifting portion is shaped and designed to hold part of a shaft as the rack members are raised and lowered. To this end, each lifting portion may be shaped like a hook. As an example, referring to FIG. 3, first upper lifting portion 240 has a curved geometry with a concave engaging surface 302. As upper lifting portion 240 engages a shaft (e.g., a bar), the shaft will slide down into the U-shaped opening formed by concave engaging surface 302. This prevents the shaft from disengaging with, or falling off of, lift rack assembly 220. Each of the remaining lifting portions may be seen to have a similar hook-like shape that helps cradle the shafts as they are engaged and lifted. Additionally, this concave shape helps guide the shafts (and the replaceable power source) towards the vehicle chassis 101 as the concave surfaces are sloped down towards the vehicle.

The rack members of lift rack assembly 220 may be actuated by one or more hydraulic cylinders that act to raise and lower the rack members. In the views of FIGS. 2-3, the hydraulic cylinders are hidden by the frame and/or chassis of vehicle 100. However, the schematic side views of FIGS. 4-7 depict a hydraulic cylinder 440 that can be used to raise and lower first rack member 232. In some cases, each rack member is driven by a separate hydraulic cylinder. The motions of the hydraulic cylinders may be coordinated so that first rack member 232 and second rack member 234 are raised and lowered together. In some cases, the first rack member 232 and second rack member 234 could be connected by another component (not shown), allowing both rack members to be driven by a single hydraulic cylinder.

A plurality of retaining members 222 may be used to hold the replaceable power source in place once it has been mounted to vehicle 100. As seen in FIG. 3, retaining members 222 may be attached (directly or indirectly) to chassis 101. In the exemplary embodiment, plurality of retaining members 222 comprises eight retaining members. These include a first upper retaining member 271, a second upper retaining member 272, a third upper retaining member 273, a fourth upper retaining member 274, a first lower retaining member 275, a second lower retaining member 276, a third lower retaining member 277 and a fourth lower retaining member 278.

In contrast to the lifting portions, which are raised and lowered, the retaining members are fixed in place on vehicle 100. Moreover, the retaining members are positioned to help lock the shafts of the replaceable power source in place once the rack members have been raised to their highest vertical positions. Specifically, first upper retaining member 271, second upper retaining member 272, third upper retaining member 273, and fourth upper retaining member 274 have a common vertical position that is close to the highest vertical position of first upper lifting portion 240 and second upper lifting portion 244. Likewise, first lower retaining member 275, second lower retaining member 276, third lower retaining member 277 and fourth lower retaining member 278 have a common vertical position that is close to the highest vertical position of first lower lifting portion 242 and second lower lifting portion 246.

Retaining members 222 may have a geometry that helps secure the shafts of a replaceable power source in place. To this end, each retaining member may have a hook-like shape. As an example, referring to FIG. 3, first upper retaining member 271 has a curved geometry with a concave engaging surface 304. Moreover, concave engaging surface 304 is oriented downwardly. This inverted orientation, compared to the upward orientation of the lifting portions (for example, first upper lifting portion 240), ensures that the shafts slide up into the U-shaped opening formed by concave engaging surface 302.

Figure 7:
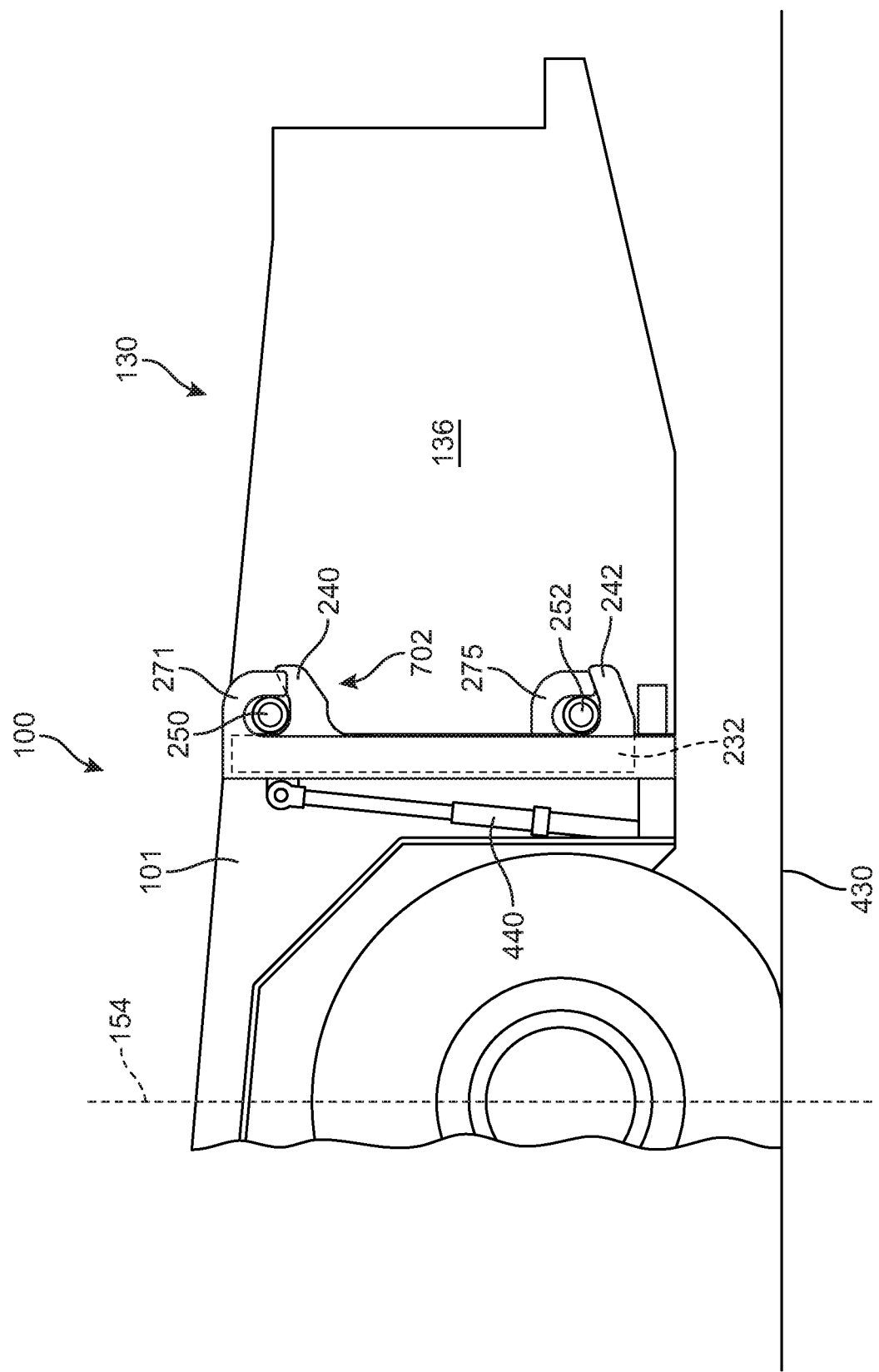

The concave geometries of the lifting portions and retaining members cooperate to completely circumscribe the retaining members when the rack members are lifted to their highest positions. This arrangement can be best seen in the schematic view of FIG. 7, which depicts replaceable power source 130 in a fully mounted position on vehicle 100. As seen in FIG. 7, upper shaft 250 is prevented from moving substantially in any radial (or non-axial) direction by first upper retaining member 271 and first upper lifting portion 240. Similarly, lower shaft 252 is prevented from moving substantially in any radial direction by first lower retaining member 275 and first lower lifting portion 242.

Each of the remaining retaining members may be seen to have a similar inverted hook-like geometry that helps secure the shafts in place when the replaceable power source has been raised to a highest position. Although the embodiments use a total of eight retaining members, including four retaining members associated with an upper shaft and four retaining members associated with a lower shaft, other embodiments could use a different number of retaining members. Some embodiments, for example, could use only two upper retaining members and two lower retaining members.

As seen in FIG. 2, system 200 can include a locking system 290 to secure the lift rack in place and prevent the replaceable power source from being unintentionally lowered while mounted. Locking system 290 includes first hydraulic cylinder 291 and second hydraulic cylinder 292, as well as a first locking bracket 293 and a second locking bracket 294. Each hydraulic cylinder can be actuated to extend a locking pin. The locking pin may be inserted through holes in the retaining brackets as well as a hole at the top of each rack member, as described in further detail below.

System 200 can include one or more horizontal alignment features. In some embodiments, a vehicle can include one or more receiving members that are configured to engage portions of a battery cage during the mounting process. As best seen in FIG. 2, system 200 may include a first horizontal receiving member 280 and a second horizontal receiving member 282. A top down view of these receiving members is provided in FIG. 10. Each horizontal receiving member comprises a tapering notch that may be engaged by a vertically oriented element (for example, a bar or tube) on battery cage 136. These features are discussed in further detail below with respect to FIG. 10.

FIGS. 4-7 are schematic views showing how a mounting and dismounting system can be used to mount a replaceable power source on a vehicle. Specifically, FIGS. 4-7 depict how first rack member 232 (or simply, rack member 232) engages, lifts, and mounts replaceable power source 130 onto vehicle chassis 101 of vehicle 100. Second rack member 234 is not visible in the side views of FIGS. 4-7, however it may be appreciated that second rack member 234 operates in an identical manner to first rack member 232. As indicated schematically in FIGS. 4-7, the raising and lowering of first rack member 232 can be accomplished using a hydraulic cylinder 440.

Figure 4:
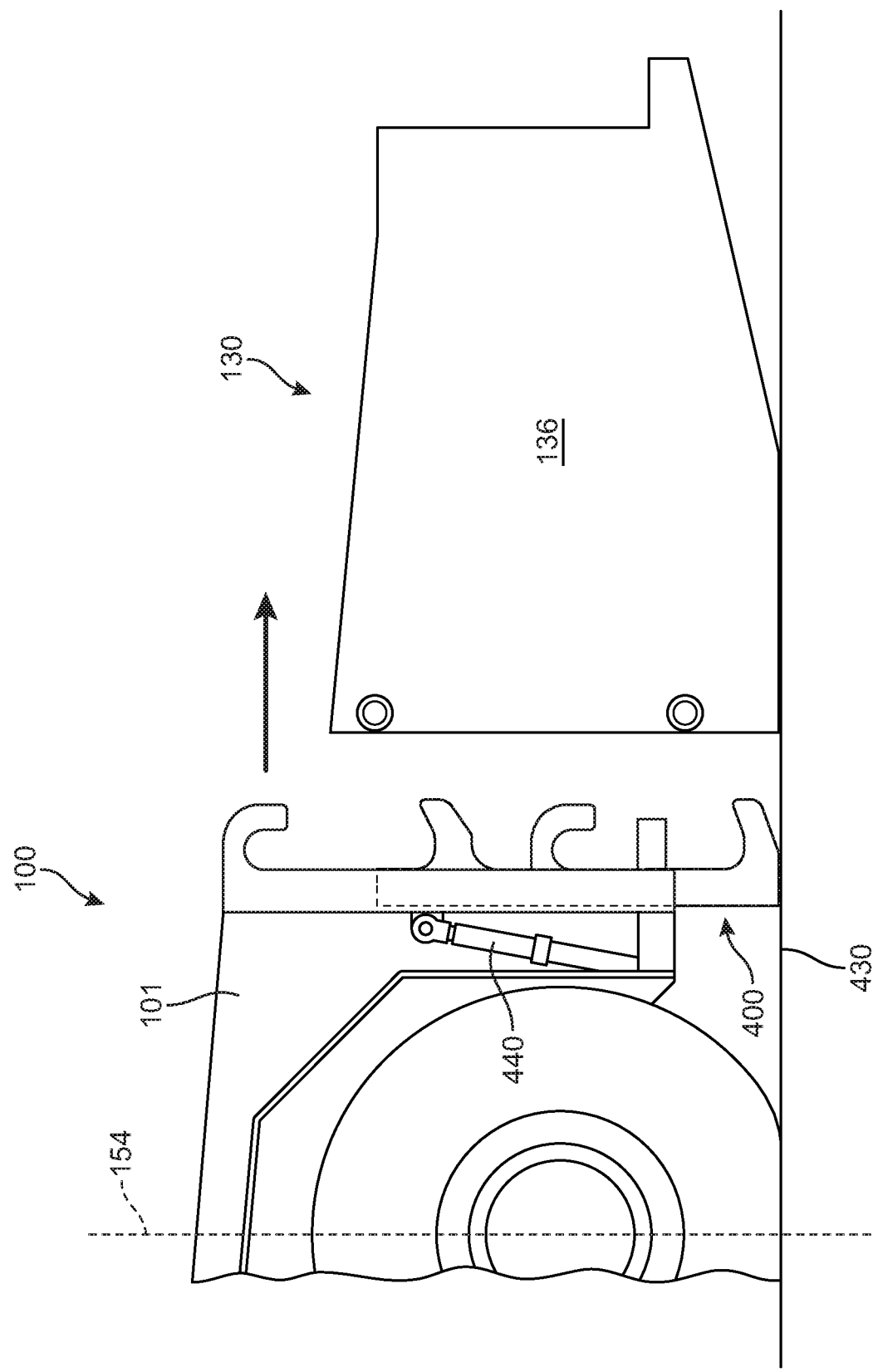
FIGS. 4-7 are schematic views of a sequence of mounting a replaceable power source to a vehicle, according to an embodiment.
Figure 5:
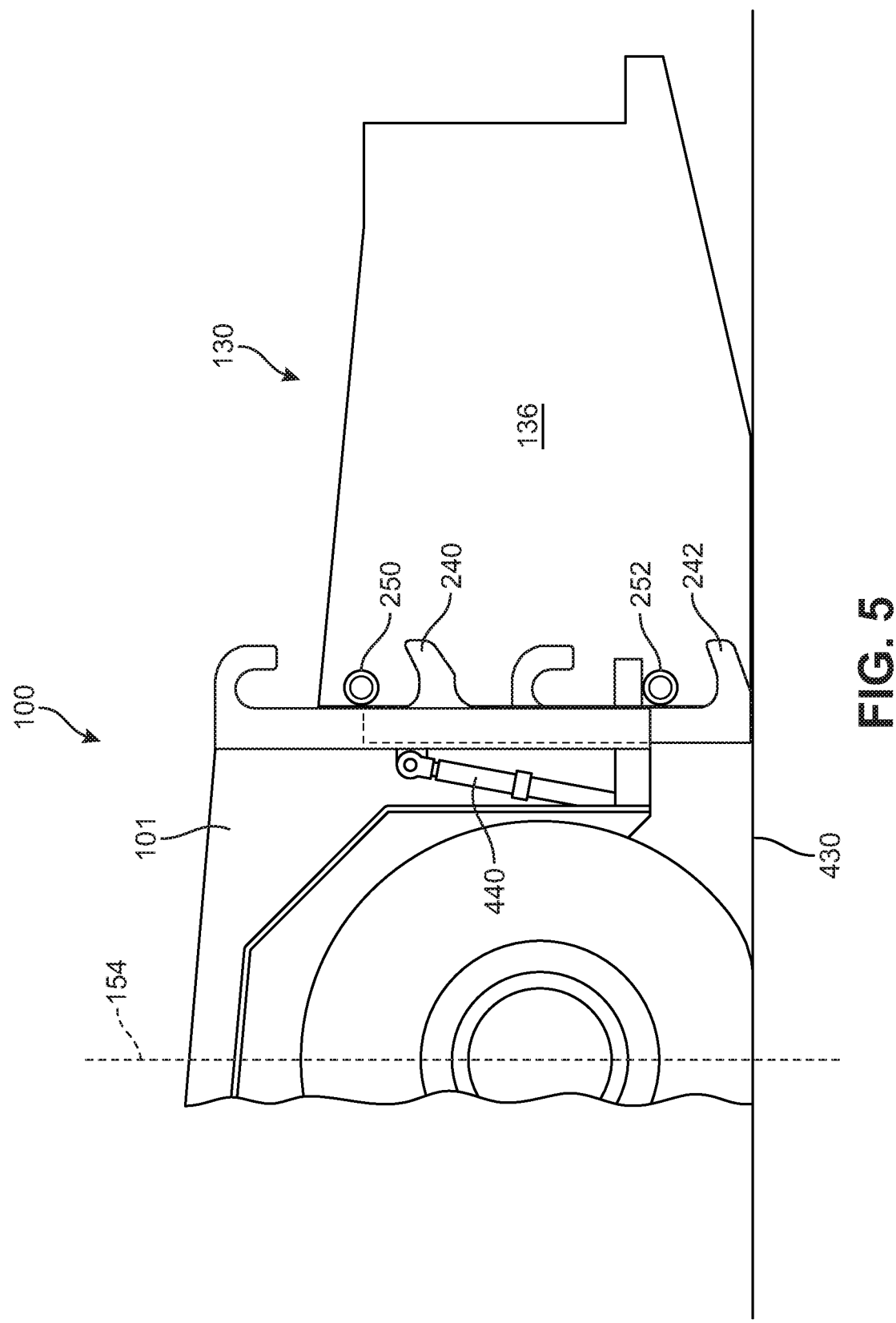

Referring first to FIG. 4, vehicle 100 may approach replaceable power source 130 in order to mount replaceable power source 130. Replaceable power source 130 may be disposed on a ground surface 430. To engage replaceable power source 130, first rack member 232 and second rack member 234 (not shown) are disposed at a lowest position 400. With the rack members at their lowest position, the lifting portions of each rack member are able to pass underneath the shafts of battery cage 136. As seen in FIG. 5, when vehicle 100 is disposed directly adjacent to replaceable power source 130, first upper lifting portion 240 of first rack member 232 may be disposed below upper shaft 250. Also, first lower lifting portion 242 of first rack member 232 may be disposed below lower shaft 252.

Figure 6:
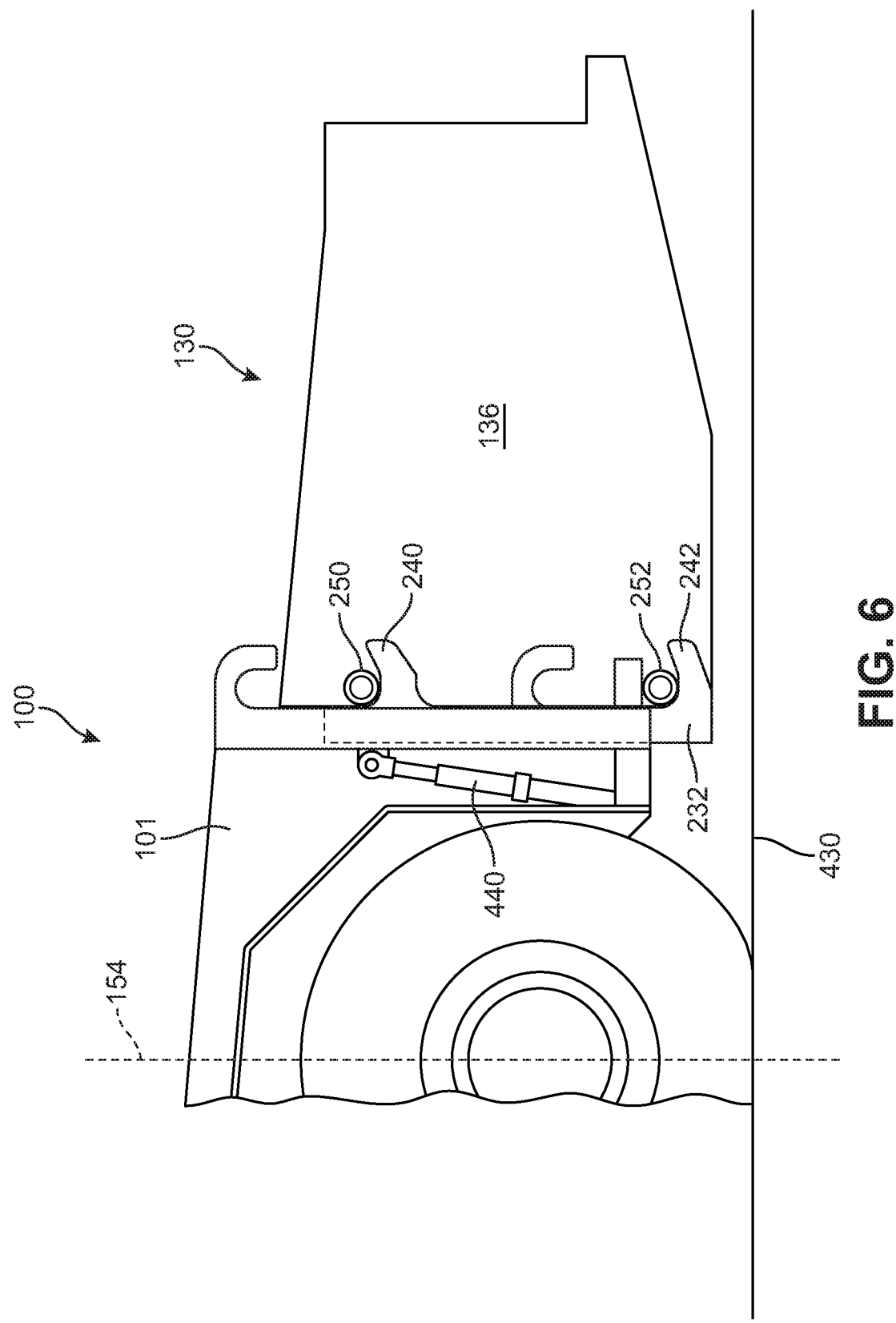

At this point, the rack members may be raised, as depicted schematically in FIG. 6. Specifically, hydraulic cylinder 440 extends to raise first rack member 232. As first rack member 232 is raised, first upper lifting portion 240 and first lower lifting portion 242 engage upper shaft 250 and lower shaft 252, respectively. Once engaged, first upper lifting portion 240 and first lower lifting portion 242 act to lift replaceable power source 130 from ground 430. Although not shown in FIG. 6, the lifting portions of second rack member 234 may simultaneously engage and lift the upper and lower shafts as well, so that there are four points of contact between the lift rack assembly 220 (see FIG. 3) and replaceable power source 130.

First rack member 232 continues to be raised up by hydraulic cylinder 440 until first rack member 232 (and second rack member 234) reaches its highest position 702, as shown in FIG. 7. Moreover, as first rack member 232 reaches this highest position, the shafts are raised into the concave openings of the retaining members. For example, upper shaft 250 is disposed through the concave opening of first upper retaining member 271. Also, lower shaft 252 is disposed through the concave opening of first lower retaining member 275.

As seen in FIG. 7, the shafts are secured between the lifting portions (from below) and the retaining members (from above). The geometries of the lifting portions and retaining members form overlapping arcs that prevent the shafts from moving substantially in any radial direction (that is, any direction perpendicular to the axis of the tube-like shafts).

Figure 11:
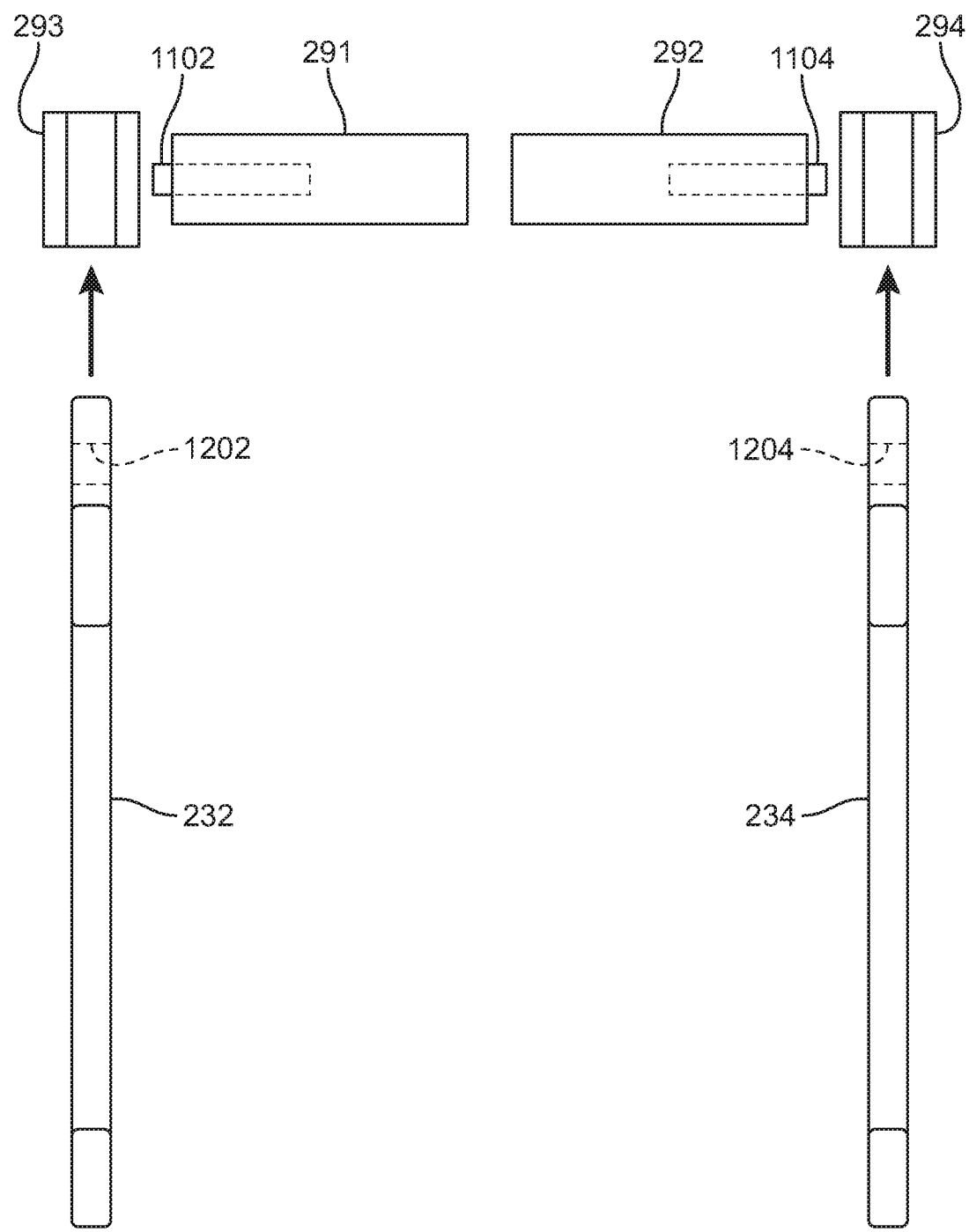
FIGS. 11-12 are schematic views showing the operation of a locking system for the mounting and dismounting system of FIGS. 3-7.
Figure 12:
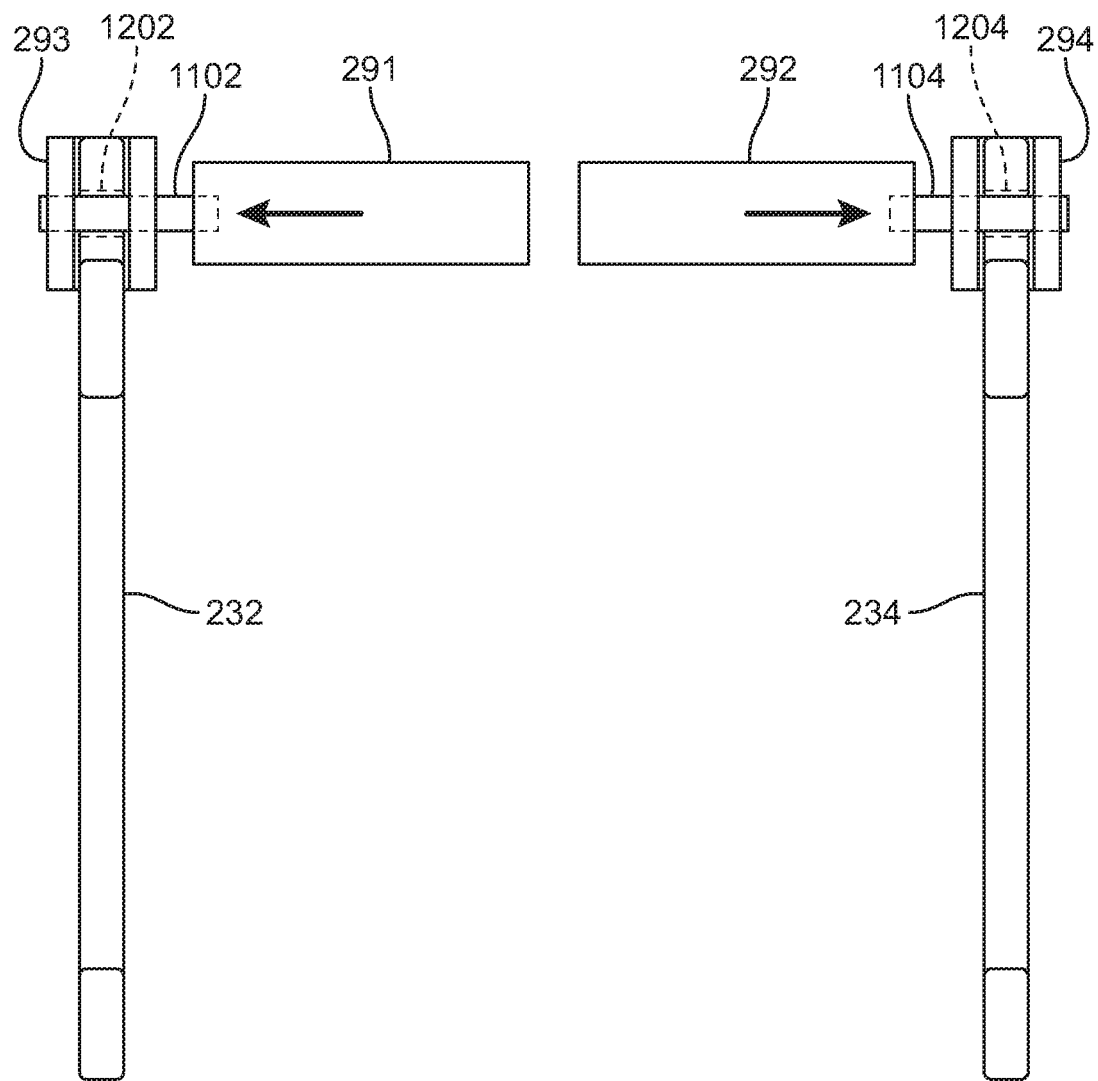

Once the rack members are in their highest (i.e., mounted) positions, the locking system can be used to keep the rack members from unintentionally sliding down. For clarity, a schematic front view of elements of the locking system and portions of each rack member are shown in FIGS. 11-12. Specifically, when first rack member 232 and second rack member 234 are not in their highest positions, the first locking pin 1102 of first hydraulic cylinder 291 and second locking pin 1104 of second hydraulic cylinder 292 are retracted, as shown in FIG. 11. When the rack members are raised to their highest positions, as seen in FIG. 12, the locking pins are extended through the brackets and the rack members. Specifically, first locking pin 1102 extends through opposing holes of first locking bracket 293 as well as a locking hole 1202 (indicated in phantom) of first rack member 232. Also, second locking pin 1104 extends through opposing holes of second locking bracket 294 as well as a locking hole 1204 (indicated in phantom) of second rack member 234. With the locking pins inserted through the locking holes of each rack member, the lift rack assembly is prevented from lowering.

It may be appreciated that a similar process to the one shown in FIGS. 4-7 can be used to dismount a replaceable power source. Specifically, the locking system can be disengaged (i.e., locking pins retracted). Then, the lift rack assembly can be lowered, which decouples the shafts from the retaining members. As the lift rack assembly is lowered further, the replaceable power source contacts the ground and the lifting portions are able to decouple from the shafts as they move lower. Finally, the vehicle can move away from the replaceable power source with the lifting portions low enough so that they do not engage the shafts.

As seen in FIGS. 5-7, each rack member moves substantially along a linear direction. In this case, the linear direction is a vertical direction that extends in parallel with vertical axis 154 of vehicle 100. By constraining the motion of the replaceable power source to a substantially linear (e.g., vertical) path, the mounting and dismounting system of the embodiments helps reduce the tendency of the replaceable power source to swing or tilt during lifting. Moreover, because the replaceable power source is only moved in a vertical direction, the retaining members can be fixed in their positions and not moved into place after the shafts have been raised to a highest position. This allows the retaining members to be integrated into the chassis or other supporting structures of the vehicle without using fasteners that could fail under heavy loads.

In a mining environment the ground surface may not be level. This means that as a vehicle attempts to mount or dismount a battery assembly, the patch of ground where the battery is raised from (or lowered to) may be slightly higher or lower relative to the patch of ground where the vehicle's wheels are located. Some embodiments of a vehicle can include provisions to ensure batteries can be mounted or dismounted on unlevel ground.

Figure 8:
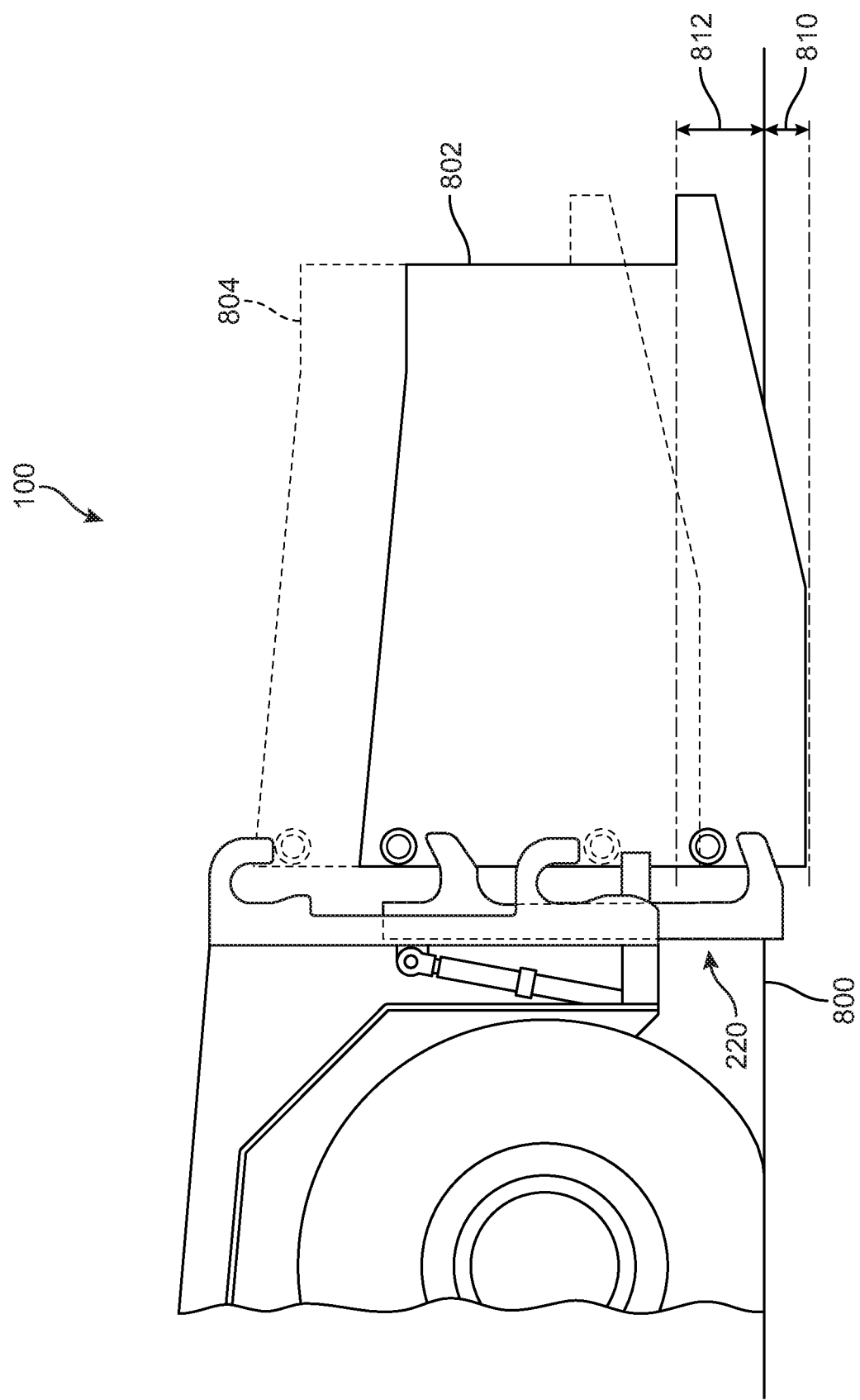
FIGS. 8-10 are schematic views showing a range of positions for a replaceable power source in which the replaceable power source can still be mounted, according to an embodiment.

The mounting and dismounting system described above and shown in FIGS. 1-7 enables a replaceable power source to be mounted even when the replaceable power source is not situated on a perfectly flat surface at the same level as the wheels of the vehicle. For example, as seen in FIG. 8, in its lowest position, the lift rack assembly 220 can engage a replaceable power source 802 that is disposed a distance 810 below ground level 800. In some embodiments, distance 810 may have an approximate value of 3.5 inches. As also seen in FIG. 8, in its highest position, the lift rack assembly 220 can engage a replaceable power source 804 that is disposed a distance 812 above ground level 800. In some embodiments, distance 812 may have an approximate value of 8.5 inches. This tolerance in the vertical displacement of a replaceable power source allows vehicle 100 to mount replaceable power sources on the uneven surfaces that often occur in underground mining tunnels.

Figure 9:
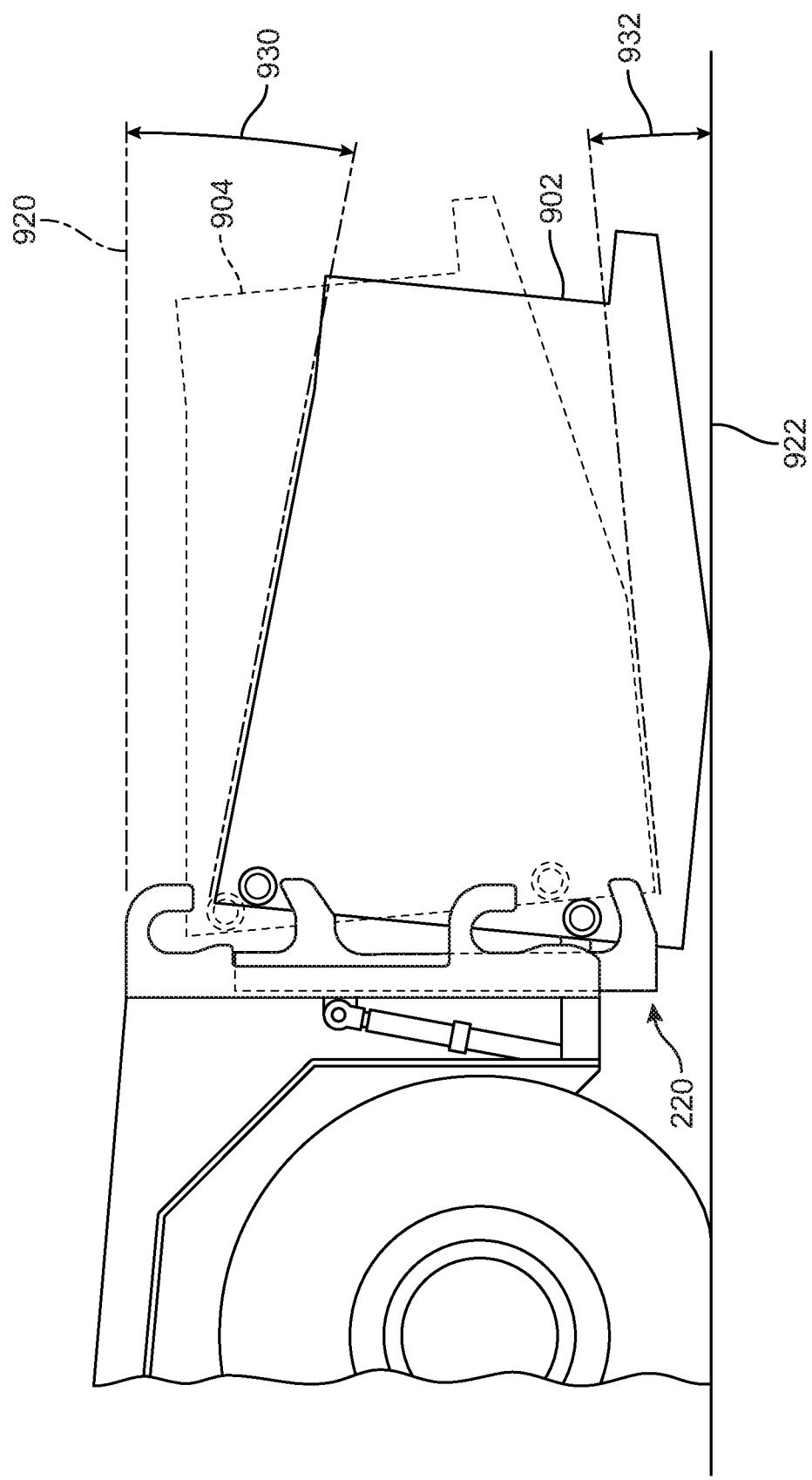

As seen in FIG. 9, the mounting and dismounting system also enables a replaceable power source to be mounted even when the replaceable power source is not level with the ground or another horizontal surface. For example, with the lift rack assembly 220 in an intermediate position, the lifting portions can engage the shafts of a replaceable power source 902 that is angled downwards from a level surface 920 by an angular displacement 930. Specifically, upper shaft 250 is engaged by upper lifting portion 240 while lower shaft 252 is engaged by lower lifting portion 242. In some embodiments, angular displacement 930 can have an approximate value of 6 degrees. Also, as seen in FIG. 9, the lifting portions can engage the shafts of a replaceable power source 902 that is angled upwards from a level surface 922 by an angular displacement 932. In some embodiments, angular displacement 932 can have an approximate value of 6 degrees. This tolerance in the angular orientation of a replaceable power source allows vehicle 100 to mount replaceable power sources on sloped ground surfaces that may occur in mining tunnels.

Figure 10:
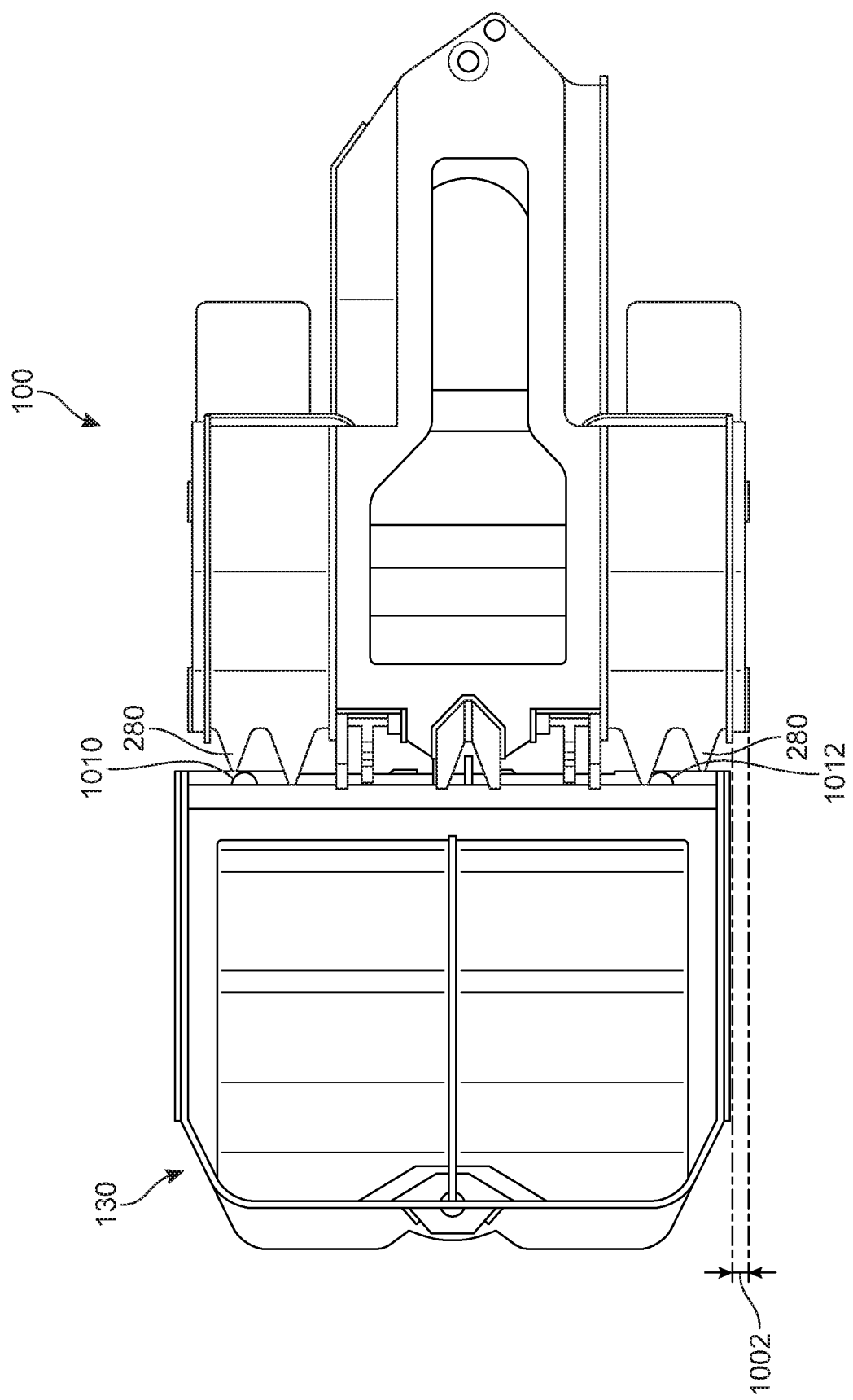

As described above, vehicle 100 may include provisions to facilitate horizontal alignment of a replaceable power source. FIG. 10 depicts a top-down schematic view of a portion of vehicle 100, including first horizontal receiving member 280 and second horizontal receiving member 282. These receiving members facilitate horizontal alignment by catching vertically disposed elements (such as bars or struts) on a replaceable power source and guiding these elements towards a central region as the vehicle makes contact with the replaceable power source. In this exemplary embodiment, replaceable power source 130 can be displaced by a distance 1002 in the horizontal direction and still have a first vertical shaft 1010 engage first horizontal receiving member 280 and a second vertical shaft 1012 engage second horizontal receiving member 282. In some embodiments, distance 1002 could have a value of approximately 2.5 inches. This arrangement allows for some tolerance in the horizontal alignment between vehicle 100 and replaceable power source 130 as a vehicle is approaching the replaceable power source 130.

While this disclosure mainly describes an onboard, removable battery, it will be understood that variations on the energy sources are possible within the scope of this concept. That is the interchangeable energy device may be a battery, a different type of battery, a generator, a fuel engine, or an adaptor for any existing energy infrastructure. It will also be understood that the system may be employed with any combination of devices, such as batteries, adapters and the like. It will also be understood that the energy source is compatible with and in communication with the drive system and drive controller. The energy source, whether battery or trolley adapter, or another type of source would be compatible with the drive system and controller. As described herein, the OCS, overhead catenary system or rail may involve options for off-wire operation such as ground level power supply or on-board energy storage systems. While on-board power generation is a third option that has received less research, this may change with hydrogen fuel cell technology. Any combination of energy systems are also contemplated to within the scope of this disclosure. Ground level power supply can be contact or contactless. Contact ground level power supply essentially employs an embedded third rail as is typically used in subway systems and was used on some early streetcar systems. Much improved versions of this technology may offer advantages in challenging environments that have heavy loads from heating or cooling needs or the need to traverse steep inclines, all of which can quickly drain a stored power system.

Another type of infrastructure which may pre-exist is contactless ground level power supply using induction coils to power the vehicle. Typically, this power transfer takes place only when the vehicle is directly above the coils, and the range of such a system may be extended by combining it with an on-board power storage, so that the coils do not need to be present along the entire length of the system. On-board energy storage offers an alternative or complement to ground level power supply. Storage mechanisms include batteries, capacitors, flywheels and in some cases, reclaiming kinetic energy from braking to increase system efficiency. A system that runs off wire for a limited segment can often recharge onboard power as runs on a wired segment. Longer spans of off wire operation may require a recharging station approach, which be attained by sufficient dwell time at a stop. For example, in some streetcar systems, a programed dwell time of contact at a station is sufficient to recharge the roof-mounted supercapacitors, charging in a short amount of time that is customary for its duty cycle.

In general, as used herein, "electric vehicle" refers to a vehicle that uses electrical power for propulsion purposes, at least in one mode of operation. Thus, electric vehicles include all-electric vehicles (e.g., a vehicle with a traction motor and only an onboard electrical energy storage device or mechanism for receiving electric energy from an off-board source, such as an overhead catenary or powered rail), hybrid-electric vehicles (e.g., a vehicle with a traction motor, an energy storage device, hydraulic propulsion, and a fuel engine, fuel cell, or the like for charging the energy storage device and/or directly generating power for running the traction motor), dual-mode vehicles (e.g., a vehicle with an engine-only mode of operation and an electricity-only mode of operation, or a vehicle with a first mode of operation where traction electricity is provided by an engine and a second mode of operation where traction electricity is provided by another source), diesel-electric and other engine-electric vehicles (e.g., a vehicle with an engine that generates electrical power for running a traction motor), and combinations and variants thereof. Electric vehicles may have one traction motor, or plural traction motors; "traction motor" refers to a motor of sufficient size and capacity to move a vehicle of sufficient size for the designated operation.

Also, the vehicle interface equipment of the wayside stations may comprise: "plug in" modules, e.g., the vehicle plugs into a receptacle of the wayside station, for receiving electrical power from the station; a continuous power interface by which a vehicle can receive off-board power while moving, such as the aforementioned catenary line or third rail; or the like.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A mounting and dismounting system for a replaceable power source, the mounting and dismounting system being attached to a chassis of a vehicle, the mounting and dismounting system comprising:
a rack member disposed along a vertical axis of the vehicle, the vertical axis extending between a top surface and a bottom surface of the vehicle, the rack member including a curved lifting portion configured to engage the replaceable power source, said lifting portion including a concave side;
an actuator for lifting the rack member;
a curved retaining member attached to the chassis, said retaining member including a concave side;
wherein the concave side of the retaining member is oriented in a downward vertical direction and wherein the concave side of the lifting portion is oriented in an upward vertical direction;
wherein the rack member has a lowest position and a highest position; and
wherein the rack member moves along a linear direction between the lowest position and the highest position, wherein the linear direction is substantially parallel with the vertical axis.

2. The mounting and dismounting system of claim 1, wherein the rack member moves relative to a retaining member attached to the chassis.

3. The mounting and dismounting system of claim 1, wherein the rack member includes a second lifting portion, and wherein the lifting portion and the second lifting portion have different vertical positions along the vertical axis.

4. A system for swapping replaceable power sources for a vehicle, comprising:
a mounting and dismounting system further comprising:
a rack member disposed on the vehicle, the rack member including a lifting portion;
an actuator for lifting the rack member;
a replaceable power source further comprising an outer casing with a shaft;
wherein the lifting portion is configured to engage the shaft; and
wherein the actuator moves the rack member in a linear direction between a lowest position and a highest position.

5. The system of claim 4, wherein the mounting and dismounting system further includes a retaining member.

6. The system of claim 5, wherein the rack member moves relative to the retaining member.

7. The system of claim 6, wherein when the lifting portion is engaging the shaft and when the rack member is in the highest position, the shaft is also engaged by the retaining member.

8. The system of claim 7, wherein:
the retaining member is curved, and wherein the retaining member includes a concave side;
the lifting portion is curved, and wherein the lifting portion includes a concave side; and
wherein the concave side of the lifting member surrounds a portion of the shaft and wherein the concave side of the retaining member surrounds another portion of the shaft.

9. The system of claim 7, wherein the shaft has a central axis and wherein the lifting portion and the retaining member prevent the shaft from moving substantially in a radial direction that is perpendicular to the central axis.

10. The system of claim 7, wherein the system includes a second rack member, the second rack member including a lifting portion for engaging the shaft of the replaceable power source.

11. A vehicle, comprising:
a replaceable power source for powering the vehicle, the replaceable power source including an outer casing with a shaft;
an onboard mounting and dismounting system for raising and lowering the replaceable power source;
the mounting and dismounting system further including:
a rack member, the rack member including a lifting portion; and
an actuator for lifting the rack member along a linear direction between a lowest position and a highest position; and
wherein the lifting portion engages the shaft to raise and lower the replaceable power source.

12. The vehicle according to claim 11, wherein the vehicle has a chassis and wherein the mounting and dismounting system includes a retaining member that is attached to the chassis, the retaining member engaging the shaft when the rack member is disposed in the highest position.

13. The vehicle according to claim 12, wherein the lifting portion comprises a hook.

14. The vehicle according to claim 13, wherein the retaining member comprises a hook.

15. The vehicle according to claim 14, wherein a concave side of the lifting portion faces towards a concave side of the retaining member.

16. The vehicle according to claim 11, wherein the mounting and dismounting system further comprises a hydraulically actuated locking pin, and wherein the rack member includes a hole for receiving the locking pin when the rack member is disposed in the highest position.

17. The vehicle according to claim 11, wherein:
the vehicle includes at least one horizontal receiving member;
wherein the outer casing includes a vertically oriented support element; and
wherein the horizontal receiving member engages the vertically oriented support element to align the replaceable power source in a horizontal direction as the replaceable power source is mounted to the vehicle.

* * * * *